April 24, 1956  D. E. ABELL ET AL  2,743,411

THREE-PHASE LOW FREQUENCY GENERATOR

Filed Sept. 24, 1954

WITNESSES:
E. G. M'Closkey.
Leon J. Taza

INVENTORS
Donald E. Abell
and Henry J. Oakes.
BY
Paul E. Friedemann
ATTORNEY

United States Patent Office 2,743,411
Patented Apr. 24, 1956

2,743,411

THREE-PHASE LOW FREQUENCY GENERATOR

Donald E. Abell, Buffalo, and Henry J. Oakes, Snyder, N. Y., assignors to Westinghouse Electric Corporation, East Pittsburgh, Pa., a corporation of Pennsylvania Application September 24, 1954, Serial No. 458,212

9 Claims. (Cl. 322—61)

Our invention relates to electric systems of control and more particularly to systems of control for changing the speeds of alternating current motors.

In a number of industrial applications, an electric motor is called upon for one portion of its operating cycle to drive its load at full speed, and for another portion of its operating cycle to drive its load at a speed that is a small fraction of the full speed.

Typical examples of such operating requirements may be found in steel mills, rubber mills, paper mills, and sugar mills. In a rubber mill as well as in a paper mill, or steel mill, the threading speed, or some other adjusting speed, may be a relatively very low inching speed. In sugar mills the centrifuges are, for the extraction of the liquid, operated at a high speed, but when the sugar is to be "plowed" from the centrifuge, the operating speed of the centrifuge must be a small fraction of the full speed.

There are a number of systems of control for this purpose known in the art, but the prior systems have not always been entirely satisfactory.

One broad object of our invention is the provision of a system of control for altering the frequency of the alternating current to be supplied to an alternating current motor to thus alter its speed from a selected substantially normal operating speed to a relatively very low inching speed.

A more specific object of our invention is the provision of generating apparatus in combination with control apparatus for selectively connecting normal frequency alternating current supply means and direct current generating means to load leads to supply the leads selectively either with normal frequency alternating current energy or with relatively very low frequency alternating current energy from the direct current generating means.

The objects recited are merely illustrative. Other objects and advantages will become more apparent from a study of the following specification and the accompanying drawing, in which.

Figures 1, 2:
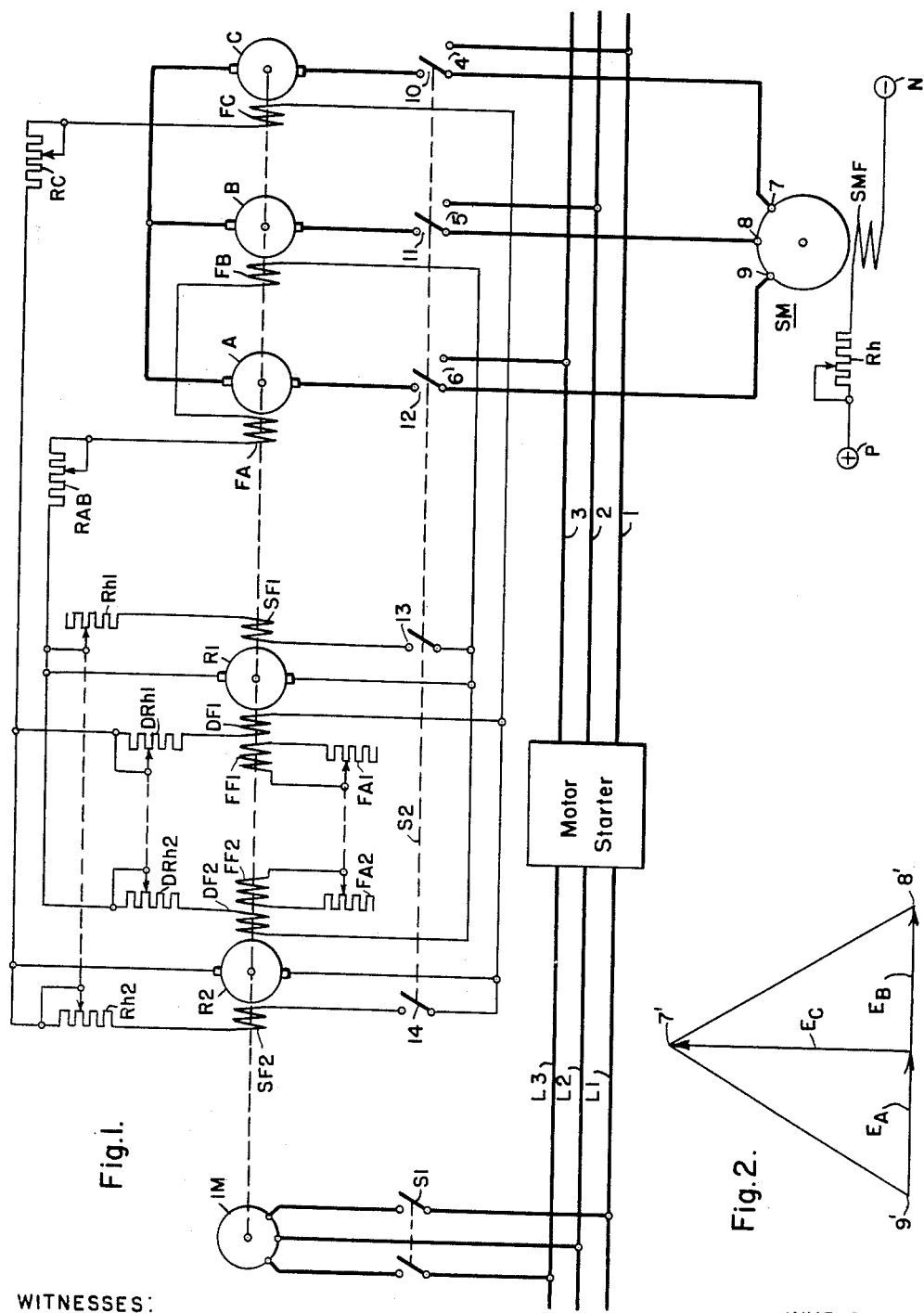
Figure 1 is a diagrammatic showing of our system of control.
Fig. 2 shows a vector diagram of aid in explaining the merits of our invention.

The diagrammatic showing of our invention illustrates a simple control system providing an accurate method for obtaining a low frequency alternating supply voltage for the purpose of providing an inching speed for the synchronous motor SM. This motor has a field winding SMF energized from the direct current terminals P and N through the adjusting rheostat Rh.

Leads L1, L2 and L3 are normally energized with alternating current of a selected normal frequency and a selected normal voltage. For the application had in mind, which usually involves a relatively large synchronous motor, the selected normal frequency may be in the range of 25 to 66⅔ cycles per second and the selected normal supply voltage may be in the range from 2300 to 13,800 volts.

During normal full speed operation leads 1, 2 and 3 are energized through the Motor Starter, and switch S2 is operated to close the contacts 4, 5 and 6 to energize the motor terminals 7, 8 and 9.

When the synchronous motor is to be operated at inching speed switch S1 is closed to energize the induction motor IM to drive the two multi-field exciters, or regulating generators R1 and R2 and to drive the three direct current generators A, B and C. Switch S2 is operated to its counterclockwise position to close contacts 10, 11, 12, 13 and 14.

The low frequency oscillator includes the two multi-field exciters R1 and R2, each of which is provided with three field windings. Each exciter is provided with a self-energizing field winding. For the exciter R1 the self-energizing field winding SF1 is connected to the armature terminals of R1 through the rheostat R$h$1 and the switch contacts 13. For the exciter R2 the self-energizing field winding SF2 is connected to the armature terminals R2 through the rheostat R$h$2 and the contacts 14. The rheostats R$h$1 and R$h$2 are ganged as shown so that simultaneous adjustment of the field circuits may be made. The exciters are shunt-tuned. Theoretically, each exciter need only be 100% tuned. However, in practice, each exciter may be somewhat overtuned. This insures driving the exciter voltage into the knee of the exciter saturation curve. Thus, changes in amplitude and frequency due to temperature changes are minimized. This does, of course, produce a small amount of distortion in the wave form, but this is not critical.

Each exciter has a differential field winding which feeds back a voltage of the other exciter. The gain of these field windings will be set in accordance with the desired amplitude of the oscillation.

The differential field DF1 for exciter R1 is connected, through the rheostat DR$h$1, to the armature terminals of exciter R2 and the differential field DF2 for the exciter R2 is connected, through the rheostate DR$h$2, to the armature terminals of the exciter R1. The rheostats DR$h$1 and DR$h$2 are ganged as shown so that the amplitude may be simultaneously adjusted.

Each exciter is provided with a third field winding, each connected upon itself through a rheostat. For example, the frequency control field winding FF1 of exciter R1 is connected upon itself through the frequency adjusting rheostat FA1 and similarly the frequency control field winding FF2 of exciter R2 is connected upon itself through the frequency adjusting rheostat FA2. These two rheostats are ganged as shown, and determine the frequency of the voltage oscillations of the exciters.

The two exciters R1 and R2 are picked to have the same frame size and as near as possible the same magnetic and electric characteristics. This means that the output of each exciter will be substantially the same. The field windings SF1 and SF2, through the ganged rheostats, effect the same tuning for the exciters and the tuning is so selected that the voltage output is driven into the knee of the saturation curve. The ganged rheostats DR$h$1 and DR$h$2 adjust the feedback and the gain is adjusted for the desired amplitude of voltage output oscillation of each exciter.

Each exciter thus has a voltage output that follows essentially a sine wave, is of the same frequency and amplitude, but the output of one exciter is displaced electrically by 90°. The output of the two exciters can, therefore, be considered a two-phase supply. This two-phase supply can be transformed to three-phase by the use of the "Scott" or "T" transformation. However, we do not use transformers since, at the low frequencies of interest in our application, such transformers would be exceedingly large.

To avoid the use of transformers and to accomplish the production of a three-phase supply for the synchronous motor SM, we connect the armature of exciter R1, through rheostat RAB, in series with the field windings FA and FB of generators A and B, respectively, and connect the armature of exciter R2, through rheostat RC, in series with the field winding FC of the generator C. Now by taking power for the synchronous motor through the contacts 10, 11 and 12, the voltage will be displaced by 120 electrical degrees, thereby creating a three-phase output.

In order that the voltage be balanced, it is necessary that one exciter have a greater gain than the other two by a ratio of 86.6/50 or 1.73. This is a minor design consideration of no particular difficulty.

Our system of control has been found very satisfactory. The oscillation can be started by merely closing contacts 13 and 14 in the self-saturating circuit. Likewise, the oscillation can be stopped by opening contacts 13 and 14.

We have thus provided a highly desirable control for inching synchronous motors since it permits stopping and starting the synchronous motor without opening and closing large current carrying circuit breakers or contactors.

The showing in Fig. 2 shows how the voltage at points 7', 8' and 9', is a typical three-phase output.

While we have shown but one circuit arrangement it is understood that our invention is capable of various adaptations and that changes and modifications may be made or substitutions resorted to which fall within the spirit of our invention.

We claim as our invention:

1. In an electric system of control, in combination, a pair of direct current exciters, each exciter having a self-energized field winding tuned to produce self-saturation, each exciter having a field winding energized from the other exciter and wound to the differential to the self-energized winding whereby the exciters will have an alternating current output with the output of one exciter having a definite phase lag with respect to the output of the other exciter, control circuit means for producing a three-phase output from the single-phase outputs of the exciter, and a three-phase load connected to said circuit means.

2. In an electric system of control, in combination, a pair of direct current exciters, each exciter having a self-energized field winding tuned to produce self-saturation, each exciter having a field winding energized from the other exciter and wound to the differential to the self-energized winding whereby the exciters will have an alternating current output with the output of one exciter having a definite phase lag with respect to the output of the other exciter, excitation means for each of said exciters for varying the frequency of the alternating current output, control circuit means for producing a three-phase output from the single-phase outputs of the exciter, and a three-phase load connected to said circuit means.

3. In an electric system of control, in combination, a pair of direct current exciters, each exciter having a self-energized field winding tuned to produce self-saturation, each exciter having a field winding energized from the other exciter and wound to the differential to the self-energized winding whereby the exciters will have an alternating current output with the output of one exciter having a definite phase lag with respect to the output of the other exciter, and circuit means connected to the outputs of the exciters for effecting a low frequency three-phase alternating current output.

4. In an electric system of control, in combination, a pair of direct current exciters, each exciter having a self-energized field winding tuned to produce self-saturation, each exciter having a field winding energized from the other exciter and wound to the differential to the self-energized winding whereby the exciters will have an alternating current output with the output of one exciter having a definite phase lag with respect to the output of the other exciter, generator exciting windings connected to the output of one exciter, and two generator exciting windings connected to the output of the other exciter.

5. In an electric system of control, in combination, a pair of direct current exciters, each exciter having a self-energized field winding tuned to produce self-saturation, each exciter having a field winding energized from the other exciter and wound to the differential to the self-energized winding whereby the exciters will have an alternating current output with the output of one exciter having a definite phase lag with respect to the output of the other exciter, three substantially like direct current generators having their three corresponding armature terminals connected to a common junction and having their other three armature terminals connected to an alternating current load, said generators each having a field winding, the field windings of two of the generators being connected in series to the output of one exciter and the field winding of the third generator being connected to the output of the second exciter.

6. In an electric system of control, in combination, a first direct current exciter having field windings so excited that its voltage output varies substantially sinusoidally and relatively slowly, a second direct current exciter having field windings similarly excited to also produce an output voltage that varies substantially sinusoidally and relatively slowly, one of the field windings of the first exciter being connected to be energized from the output of the second exciter and one of the field windings of the second exciter being connected to be energized from the output of the first exciter, whereby a certain phase relation is maintained between the output voltages of the two exciters, a pair of direct current generators excited by one exciter and a third direct current generator excited by the second exciter.

7. In an electric system of control, in combination, a first direct current exciter having field windings so excited that its voltage output varies substantially sinusoidally and relatively slowly, a second direct current exciter having field windings similarly excited to also produce an output voltage that varies substantially sinusoidally and relatively slowly, one of the field windings of the first exciter being connected to be energized from the output of the second exciter and one of the field windings of the second exciter being connected to be energized from the output of the first exciter, whereby a certain phase relation is maintained between the output voltages of the two exciters, a pair of direct current generators excited by one exciter and a third direct current generator excited by the second exciter, said three generators having three corresponding terminals connected together and an alternating current load connected to the other three corresponding terminals.

8. In an electric system, in combination, a first self-excited exciter tuned to saturation, a second self-excited exciter tuned to saturation, a differential field winding of the first exciter excited from the second exciter and a differential field winding of the second exciter excited from the first exciter, whereby an electric oscillatory system is provided, whereby the voltage output of the first exciter varies substantially as a sine wave and the output of the second exciter varies similarly but with a substantially fixed phase relation.

9. In an electric system, in combination, a first self-excited exciter tuned to saturation, a second self-excited exciter tuned to saturation, a differential field winding of the first exciter excited from the second exciter and a differential field winding of the second exciter excited from the first exciter, whereby an electric oscillatory system is provided, whereby the voltage output of the first exciter varies substantially as a sine wave and the output of the second exciter varies similarly but with a substantially fixed phase relation, and means for varying the frequency of the oscillations of the electric oscillatory system.

References Cited in the file of this patent
UNITED STATES PATENTS
2,619,629    Schmitz _____ Nov. 25, 1952